April 14, 1959 L. J. WAHL Re. 24,630
MASSAGE DEVICE
Original Filed April 1, 1953
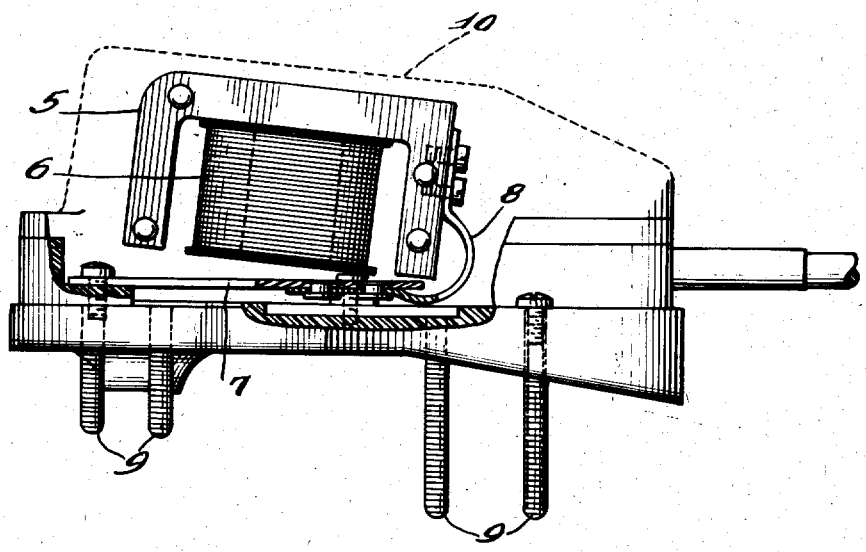
Inventor.
Leo J. Wahl.
By Zabel, Baker, York, Jones and Dithmar
Attorneys United States Patent Office Re. 24,630
Reissued Apr. 14, 1959

24,630

MASSAGE DEVICE

Leo J. Wahl, deceased, late of Sterling, Ill., by John F. Wahl, Robert L. Wahl, and Warren P. Wahl, executors, Sterling, Ill.; said Leo J. Wahl assignor to Wahl Clipper Corporation, Sterling, Ill., a corporation of Illinois Original No. 2,768,621, dated October 30, 1956, Serial No. 346,108, April 1, 1953. Application for reissue October 24, 1958, Serial No. 769,527

4 Claims. (Cl. 128—41)

Matter enclosed in heavy brackets [ ] appears in the original patent but forms no part of this reissue specification; matter printed in italics indicates the additions made by reissue.

My invention relates to a [massage device of] *vibratory unit which may be used in massaging devices such as* the type adapted to be mounted on the back of an operator's hand. Such a device transmits vibrations to the operator's fingers which are in turn applied to the desired parts of the body for massage purpose.

My U.S. Patent No. 1,832,437 illustrates one of my prior massage devices, while my earlier U.S. Patent No. 1,818,287 (issued on a later filed application) shows the device equipped with a hand mounting attachment. My present invention relates to the same general type of device.

The massage device of this invention and those of my prior patents is of the type which uses an electromagnet and an armature to produce the desired vibrations. It comprises an electromagnet of substantial mass and an armature mounted in effective relation with the electromagnet. The latter is energized by alternating or pulsating current and the armature is successively attracted and released by the electromagnet to produce vibrations suitable for massage. The armature is the element which is associated with the operator's hand.

Electromagnetic massage devices of this character necessarily are tuned to vibrate at a resonant frequency which is a multiple of the frequency of the alternating or pulsating current applied to the electromagnet. Usually the tuned frequency of the device is related to the frequency of the applied current by a factor of [one] *two,* although *other* factors [of two or more] are possible. *For example in a 60 cycle A.C. current, the tuned or resonant frequency of the device would be 120 cycles per second.*

As is well known, a vibrating device of this character is tuned by assigning proper mass to both the electromagnet and the armature, and by providing a matching resilient connection between the two. Proper selection of these variables, of course, requires consideration of the value of the voltage applied to the electromagnet as well as its frequency.

Prior massage devices [of this character] have been tuned to vibrate at resonant frequency under *no load* conditions *such as* when the *hand carried and hand operated* device is not mounted on the hand of an operator, *or is held loosely.* This means that the vibrational energy delivered by the device is substantially a maximum when the device is unmounted. It other words, when [the] *a hand carried massaging* device is held loosely in the hand, *i.e. under no load conditions* and the current is turned on, the device [vibrates] *will vibrate* with maximum energy in a manner which is regarded as somewhat objectionable. This is a practical shortcoming of the electromagnetic device.

Competing massage devices utilize a rotary motor with an eccentric to produce vibratory action. This type of massage device is substantially free of the aforesaid objection present in the electromagnetic type. Despite the fact that the rotary motor type is considerably more expensive to manufacture than the electromagnetic type, the former is preferred by many because of its freedom from objectionable vibration when held loosely in the hand.

One object of my invention, therefore is to provide an electromagnetic type massage device which is substantially free of objectionable vibration *under no load conditions or in the case of a hand carried and hand operated massaging device,* when unmounted.

Another object of the invention is to provide an improved electromagnetic type massage device which can be constructed at a cost which does not exceed that of present electromagnetic type devices. This cost, as previously mentioned, is substantially below that of competing motor driven devices.

My invention contemplates the provision of an electromagnetic type massage device which is substantially the same with those shown in my aforesaid prior patents with the exception that my present device is tuned in accordance with a new principle. Rather than tuning the device for resonant operation when unmounted *or under no load,* in accordance with this invention, I tune the device for resonant operation when it *operates under a load or* is mounted on the operator's hand. In other words, I take into consideration the *effect of the load or the* mass of the operator's hand in designing the device for resonant operation. As a result, the device is substantially detuned and non-vibratory when unmounted. This, of course, eliminates the aforesaid objection to prior electromagnetic type massage devices.

Other objects, advantages and details of my invention will appear as the description proceeds, reference being had to the accompanying drawing wherein one form of the invention is shown. It is to be understood that the description and drawing are illustrative only, and that the scope of the invention is measured by the appended claims.

In the drawing, the single figure is a view in side elevation, partly broken away, of a massage device embodying my invention.

In one common form, an electromagnetic type massage device includes an E-shaped core 5, *but the shape of the core is not critical.* [an] *An* energizing coil 6 *is* on the core, *and* an armature 7 *is fixed to the casing 10* in effective relation to the face of the core. *In addition,* a resiliently biased hinge 8 [interconnecting] *interconnects* the armature and the core directly or indirectly *so that the electromagnet including the core 5 and the coil 6 are resiliently and pivotally mounted inside the casing 10.* [, and] *Furthermore looped coil springs 9 are provided and comprise* means [9] for mounting the armature on the back of an operator's hand, *when the device is to be hand carried and hand operated.* The core and coil, the electromagnet, have substantial mass and may be regarded as the inertial portion of the device against which the armature or moving portion reacts.

In a more complete form, the device includes a casing 10 which is mounted on the armature and encloses the core, coil, armature, and biased hinge arrangement. *The shape of the casing is not critical and may be suited to the purpose for which the vibrating unit is to be used. For example when it is to be used in a vibratory pillow massaging device, the casing may be provided with large spaced parallel surfaces.*

*Regardless of the ultimate purpose for which the vibrating unit is to be used,* the hinge arrangement 8, [in the usual form of the device] comprises a leaf spring of predetermined stiffness which intermediate its ends is curved to provide a right angle bend, one end of the spring being attached to core 5 and the other to armature 7.

In the practice of the present invention, the biased hinge or leaf spring arangement 8 which interconnects the armature and the core directly or indirectly has a stiffness which [exceeds by about 8%–12% the stiffness required to produce resonant vibration when the device is unmounted] *causes the tune of the device to be at least from 8% to 12% above resonance, i.e. at least over 130 cycles per second since the resonant frequency is 120 cycles per second when a 60 cycle current is applied to the coil, and a value from at least 8% to 12% higher than 120 cycles is at least 130 cycles.* This extra stiffness provides a sufficiently detuned condition so that the device is substantially non-vibratory *under no load conditions or* when not applied to the hand. It is true that low amplitude force vibrations do occur, but the energy developed thereby is so low that it is wholly unobjectionable.

When a device tuned as aforesaid is applied to an operator's hand, *or is under load,* the mass of the hand added to that of the armature *or the effect of the load thereon* establishes a new relationship between the parameters of the system. The new relationship is such that the device is then tuned to vibrate at resonance. Thus, the vibratory energy output of the device when mounted is at maximum, and the device operates at desired efficiency.

A device constructed in accordance with my invention, in addition to eliminating the objectionable vibrations which occur when the device *is not under load or* is unmounted, in fact operates with improved efficiency when it *operates under load conditions or* is mounted on the hand. This is because prior devices experienced a certain amount of detuning and corresponding loss of efficiency when mounted for operation *or when under load.*

From the above description it is thought that the construction and advantages of my invention will be readily apparent to those skilled in the art. Various changes in in detail may be made without departing from the spirit or losing the advantages of the invention.

Having thus described my invention, what I claim as new and desire to secure by Letters Patent is:

1. A [massage device for attachment to the back of an operator's hand] *vibratory unit* comprising [an E-shaped] *a* core, an energizing coil on said core, an armature in effective relation to the face of said core, a leaf spring interconnecting said armature and said core *so that said core can resiliently vibrate with respect to said armature,* [and means mounting said armature to the back of an operators' hand] *the stiffness of* [the] said leaf spring [exceeding by about 8%–12% the stiffness of a spring required to produce resonant vibrations when the device is not applied to the hand] *causing the tune of the core and the coil mounted thereon to be at least 8% above the resonance under no load so that the device is substantially non-vibratory under no load, but close enough to resonance so that* [whereby] the device [produces] *can produce* resonant vibrations [when applied to the hand and is substantially non-vibratory when not applied to the hand] *under load.*

2. A massage device for attachment to the back of an operator's hand comprising a core, an energizing coil on said core, an armature in effective relation to the face of said core, a biased hinge interconnecting said armature and said core *so that said core can resiliently vibrate with respect to said armature,* and means mounting said armature to the back of an operator's hand, the stiffness of the bias of said hinge [exceeding by about 8%–12% of the stiffness of a bias required to produce resonant vibration] *causing the tune of the core and coil mounted thereon to be at least 8% above resonance* when the device is not applied to the hand *so that the device is substantially non-vibratory, said tune close enough to resonance* so that [whereby] the device [produces] *can produce* resonant vibrations when applied to the hand. [and is substantially non-vibratory when not applied to the hand.]

*3. The apparatus set forth in claim 1 wherein the tune of the core and the coil mounted thereon is at least 12% above resonance under no load.*

*4. The apparatus set forth in claim 2 wherein the tune of the core and coil mounted thereon is at least 12% above resonance when the device is not applied to the hand.*

References Cited in the file of this patent or the original patent

UNITED STATES PATENTS

| | | |
|---|---|---|
| 1,918,458 | Dremel | July 18, 1933 |
| 2,054,590 | Wahl | Sept. 15, 1936 |